United States Patent [19]

Moore et al.

[11] Patent Number: 6,035,517
[45] Date of Patent: Mar. 14, 2000

[54] CABLE HARNESS PRODUCTION SYSTEM

[75] Inventors: Patrick Moore; Patrick Dunne, both of Dublin, Ireland

[73] Assignee: Qualtron R & D Teoranta, Letterkenny, Ireland

[21] Appl. No.: 09/210,400

[22] Filed: Dec. 14, 1998

[30] Foreign Application Priority Data

Dec. 22, 1997 [IE] Ireland ..................................... 970917

[51] Int. Cl.⁷ ................................................... B23P 23/00
[52] U.S. Cl. .......................... 29/564.4; 29/593; 29/174.2; 29/755; 81/9.4
[58] Field of Search ................................... 29/564.4, 593, 29/742, 755; 364/579; 81/9.4; 174/48; 324/537, 555; 269/56, 903

[56] References Cited

U.S. PATENT DOCUMENTS

| | | | |
|---|---|---|---|
| 3,930,307 | 1/1976 | Schotthoeffer et al. ................... | 29/628 |
| 4,959,792 | 9/1990 | Sullivan ................................... | 354/579 |
| 5,016,345 | 5/1991 | Aligue et al. .............................. | 29/742 |
| 5,033,335 | 7/1991 | Yatsu et al. ................................ | 81/9.4 |
| 5,357,052 | 10/1994 | Hakeem .................................... | 174/48 |

FOREIGN PATENT DOCUMENTS 0773610  5/1997  European Pat. Off. .

Primary Examiner—P. W. Echols
Assistant Examiner—John C. Hong
Attorney, Agent, or Firm—Jacobson, Price, Holman & Stern, PLLC

[57] ABSTRACT

A production system (1) has workstations (2), each having a bench (3) with a movable service rail (4). Each service rail (4) is movable to allow very quick configuration of the system (1). Each rail (4) also has an electrical power duct (15) and a pneumatic supply (14) having outlets for production and test apparatus on the bench (3). There is a single switch (17) for each duct 15 and this allows interconnection to an overhead duct system (5). The production apparatus includes tools for stripping cable jackets, for unravelling individual wires (61), for stripping insulation by heating (71) and for applying connectors (104) and for applying a protective sleeve (111). A test system (130) has a controller (132) and a modular test fixture (135) with components which are easily removed and replaced.

9 Claims, 8 Drawing Sheets

40 Cut cable

50 Strip jacket

60 Unravel cables

70 Strip cables

80 Fit drain wire sleeve

90 Fit outer protective sleeve

CABLE HARNESS PRODUCTION SYSTEM

INTRODUCTION

1. Field of the Invention

The invention relates to the production of cable harnesses, and particularly cable harnesses for electronic equipment such as telecommunication switches.

2. Prior Art Discussion

Particular aspects of production of cable harnesses are that raw material handling is difficult because some components are very small and cables by their nature do not lend themselves to automated handling. However some systems such as those described in European Patent Specification No. EP0773610 (Stocko), U.S. Pat. No. 5,016,345 (Mecanismos Auxiliaries), and U.S. Pat. No. 3,930,307 (Allied Chemical Corp.) have been devised to minimise operator handling and improve efficiency. For example, in U.S. Pat. No. 3,930,307 a conveyor line conveys pallets carrying wiring harnesses to workstations. Overhead projectors project instructions and diagrams on the pallets. Pallets are passed to the next stage only when operations at a current stage are complete.

It appears that these systems would operate efficiently in situations where there are relatively high volumes of a particular harness product and change-over from one product to another is infrequent. However, it also appears that it would be time-consuming and expensive to prepare such production lines for new batches of short runs on a frequent basis.

3. Objects of the Invention

There is therefore a need for a cable harness production system which provides for efficient production, while at the same time being flexible so that it can be quickly reconfigured for production of different harness products without loss of efficiency.

SUMMARY OF THE INVENTION

The invention provides a cable harness production system comprising:
- a series of movable workstations, each comprising a movable workbench and a movable service rail, wherein each service rail comprises:
  - an upstanding frame having a pair of uprights and at least one transverse brace, and
  - an electrical power duct extending between the uprights and having an outlet socket and a switch connected to an upwardly-directly service cable;
- an overhead electrical power duct grid having sockets connected to the service cables of the workstations;
- cable harness production apparatus mounted on the workbenches and receiving power from the service rails; and
- a test apparatus comprising a controller and a fixture having sockets into which harness connectors are connected, wherein the sockets are mounted on modular socket supports, in turn mounted on a support frame, each socket support having a plurality of sockets of a particular type and being removably mounted on the frame.

This is a very flexible system which provides for quick start-up for new batches. It also allows multiple types of harnesses to be produced on a relatively small production floor area.

In one embodiment, the sockets of each modular support are connected by an internal loom to a removable strip board beneath the socket support.

Preferably, sockets of each modular support are connected by an internal loom to a removable strip board beneath the socket support, and the strip board comprises a plurality of parallel bus bars, each bus bar being connected to a particular terminal of all sockets on the socket support.

In one embodiment, the controller comprises means for interconnecting combinations of bus bars to perform continuity and high voltage tests.

In another embodiment, each service rail further comprises a pneumatic supply extending between the uprights, the supply having connectors along its length.

In a further embodiment, the production apparatus includes an unravelling tool comprising a pair of cylinders mounted on supports which are movable between an open position and a closed position at which the cylinders are spaced-apart by a pre-determined distance for unravelling of twisted cables drawn between the cylinders.

Preferably, the production apparatus includes a sleeve stripping tool comprising a pair of heated blades mounted on supports movable between open and closed positions, the blades being spaced-apart in the closed position by a distance slightly greater than the conductor diameter whereby the blades heat insulation and allow the insulation to be drawn off the conductors as the cables are pulled through the tool.

Ideally, the blades are heated to a temperature of approximately 350° C.

In a further embodiment, the stripping tool further comprises a fume extractor mounted above the blades.

DETAILED DESCRIPTION OF THE INVENTION

BRIEF DESCRIPTION OF THE DRAWINGS

The invention will be more quickly understood from the following description of some embodiments thereof, given by way of example only with reference to the accompanying drawings in which.

DESCRIPTION OF THE PREFERRED EMBODIMENTS

Figure 1:
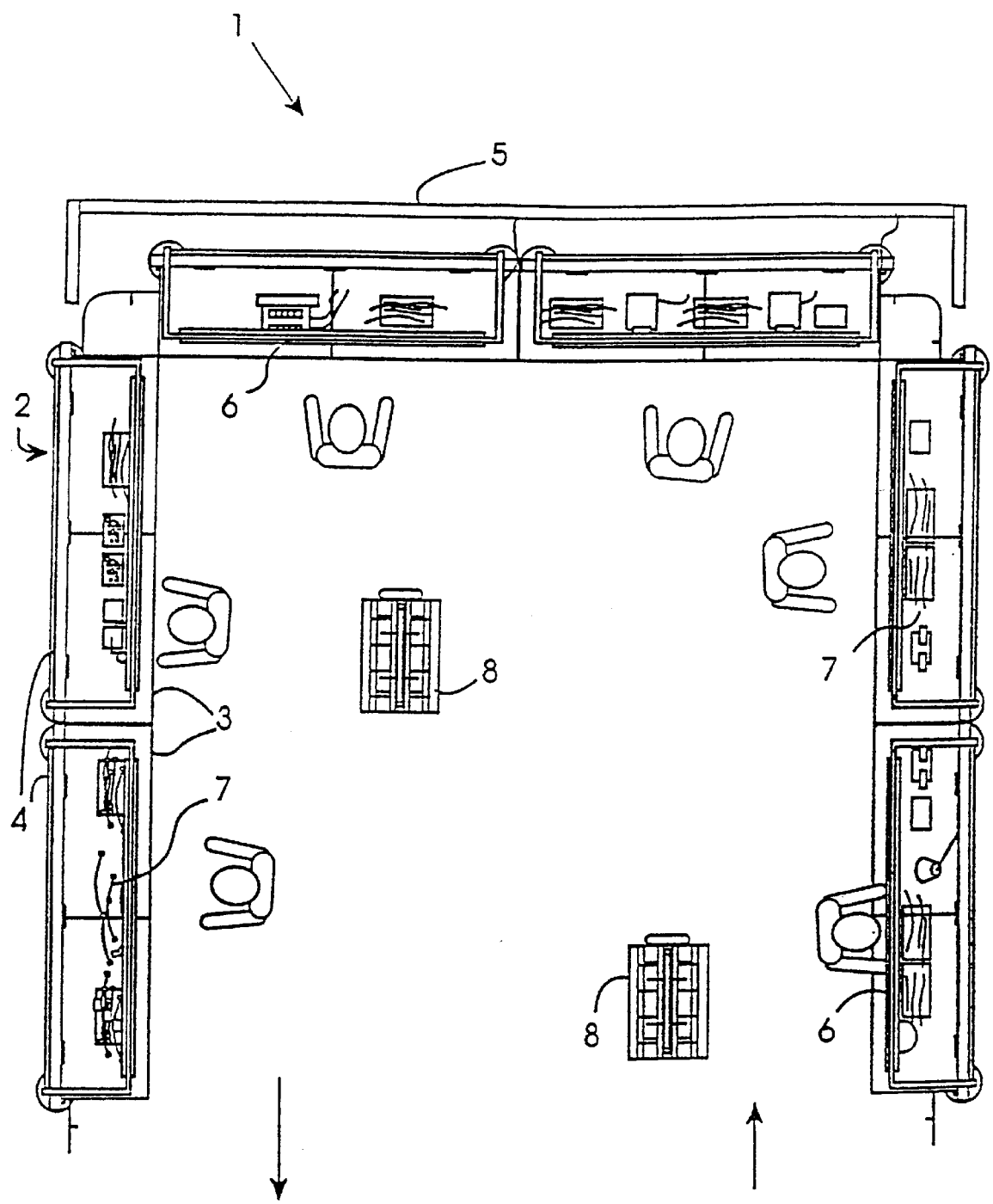
FIG. 1 is a diagrammatic plan view of a production system of the invention.
Figure 2:
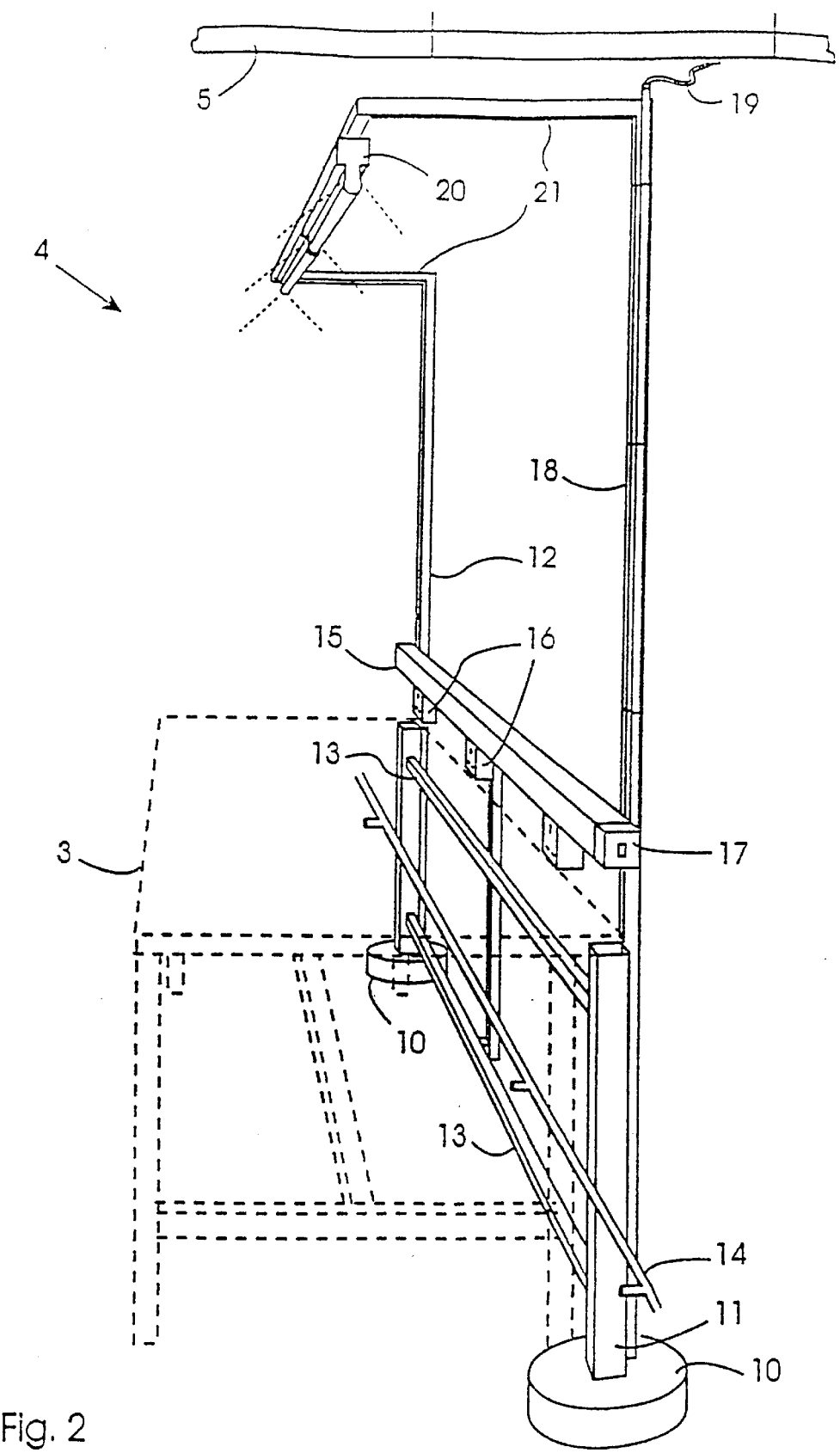
FIG. 2 is a perspective view from the side of a workstation of the system.
Figure 3:
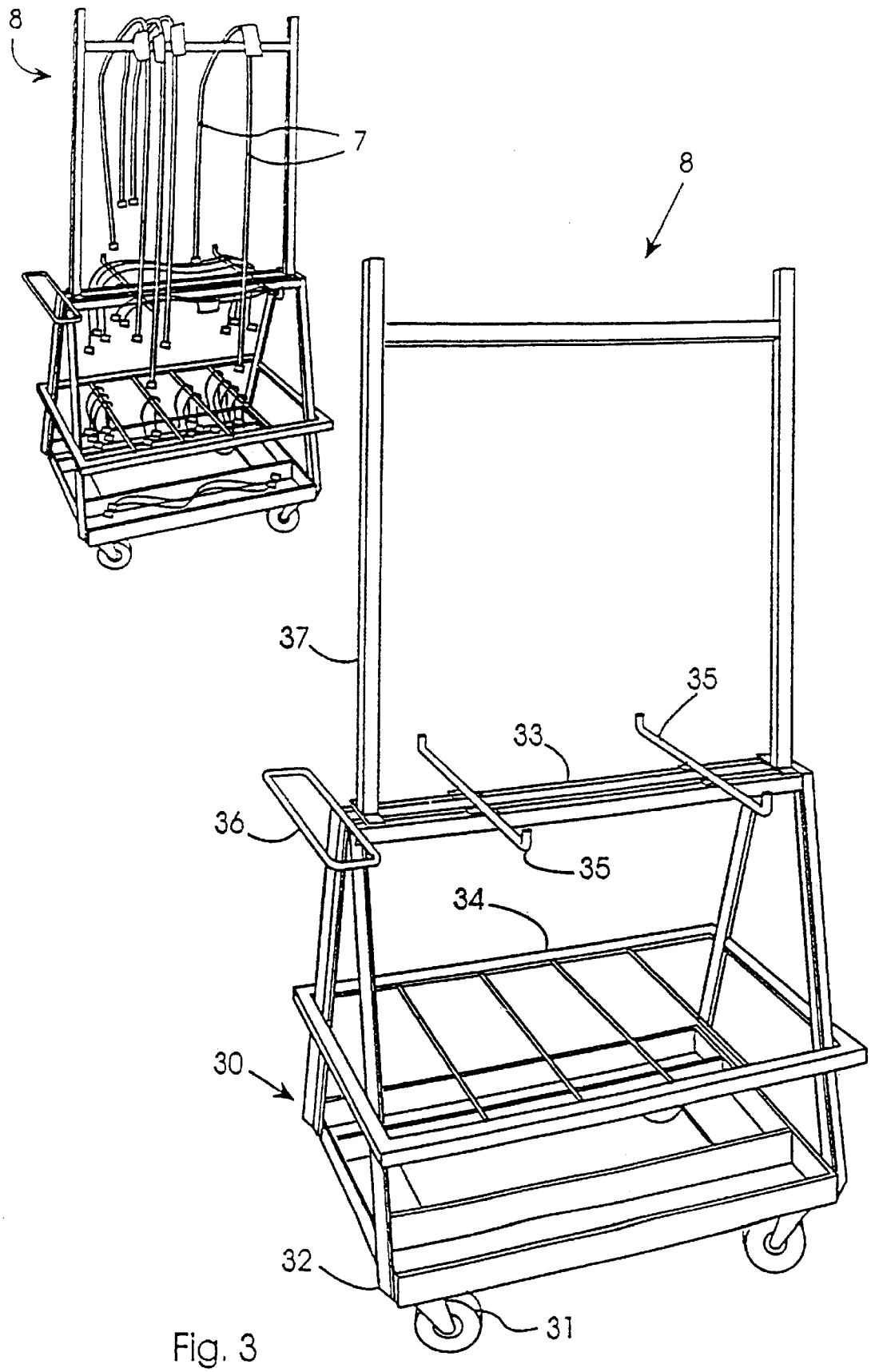
FIG. 3 is a pair of perspective views of a trolley of the system, one view showing construction of the trolley, the other showing the trolley in use.

Referring to the drawings, and initially to FIGS. 1 to 3, a production system 1 of the invention is illustrated. The system 1 comprises in this embodiment six workstations 2, each comprising a movable workbench 3 and a movable service rail 4. These are described in more detail below. The system 1 also comprises a grid of overhead power ducts 5. Power is delivered from the ducts 5 via the service rails 4 to various production apparatus 6 on the benches 3. FIG. 1 also illustrates work-in-progress 7 and two trolleys 8.

Referring particularly to FIG. 2, construction of a service rail 4 is now described in more detail. Each service rail 4 comprises a pair of heavy disc-shaped feet 10 supporting a pair of base uprights 11, in turn supporting a pair of narrower main uprights 12. There are two structural crossbars 13 interconnecting the uprights. In addition, a pneumatic supply pipe 14 extends across the uprights and has outlets for connection to production apparatus. Each service rail 4 also comprises an electric power duct 15 extending between the uprights. Each duct 15 has a series of sockets 16 just above bench surface level and at one end of the duct 15 there is a switch 17 for switching of all electrical power for the rail 4. A vertical cable duct 18 extends from the switch 17 along one of the main uprights 12 and a cable 19 within this duct is connected at one end to the rail electrical switch 17 and at the other end to a socket in an overhead power duct 5. Each rail 4 also comprises a fluorescent lamp 20 on cantilevered support arms 21 for illumination of the workbench 3. However, in some environments illumination may not be required because the level of ambient illumination is sufficient.

An important aspect of the invention is the fact that the workstations 2 can be very quickly configured for production of a particular harness product. This allows available factory floor space to be used to configure production systems very quickly and in a manner which allows efficiency. As is clear from FIG. 1 relatively little space is taken up by the production system because of the U-shaped configuration. It will be appreciated that this system may be very quickly set up by simply moving workbenches 3 and service rails 4 according to the desired configuration. Each service rail 4 may be easily moved by simply disconnecting the cable 19 from the overhead power duct and the pneumatic sockets, moving it to the desired location and re-connecting to new sockets. Each service rail 4 provides a comprehensive set of electrical and pneumatic outlets for use by the operator according to the desired production apparatus configuration.

While these features may appear to be very simple, it has been found that they are extremely effective for quick harness product production set-up, and for providing an efficient system for use by operators.

Referring particularly to FIG. 3, the trolley 8 is now described in more detail. Each trolley 8 comprises a support frame 30 on castor wheels 31. The frame 30 comprises a broad base 32 which tapers upwardly and inwardly to an upper base 33. The frame supports a platform 34 having transverse bars to support work-in-progress lying flat on the bars. The upper base 33 supports transverse suspension bars which extend upwardly at each end. Also, the upper base 33 supports a looped bar 36. Finally, the trolley 8 comprises an upper H-section 37 on the upper base 33.

It will be appreciated that the trolley 8 allows movement of work in progress between the workstations in a comprehensive manner. Work in progress which is best placed on a platform may be placed on the platform 34, while relatively complex pieces such as complex harnesses may be suspended from the suspension bars 35 or 36. Relatively large harnesses may be suspended from the H-section 37. Thus, the trolley 8, while requiring relatively little "footprint" provides for movement of a wide variety of different types of work in progress and harnesses between workstations in a simple and effective manner. The configuration of the various supports such as the support bars 35 and 36 allows small batches to be transported together for excellent traceability. Small items are supported particularly effectively on the looped bar 36.

Figure 4:
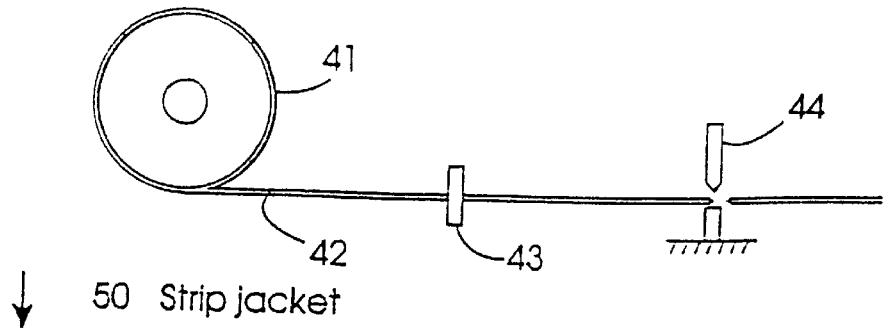
FIGS. 4 to 13 inclusive are diagrams illustrating production apparatus in use for production of cable harnesses.

Referring now to FIGS. 4 to 13 inclusive various production apparatus forming part of the workstations 2 are described in operation. The apparatus is described in the context of production flow for ease of understanding. Referring initially to FIG. 4, a step 40 of cutting cable is illustrated. A reel 41 is mounted on a support (not shown) from which cable 42 is drawn to a guide 43 and to a cutter 44. This arrangement is used to produce a batch of cables of a specific length for a harness product. After cutting, quality control checks are performed to ensure that all cables are the correct length, none are damaged, and all wires are correct.

Figure 5:
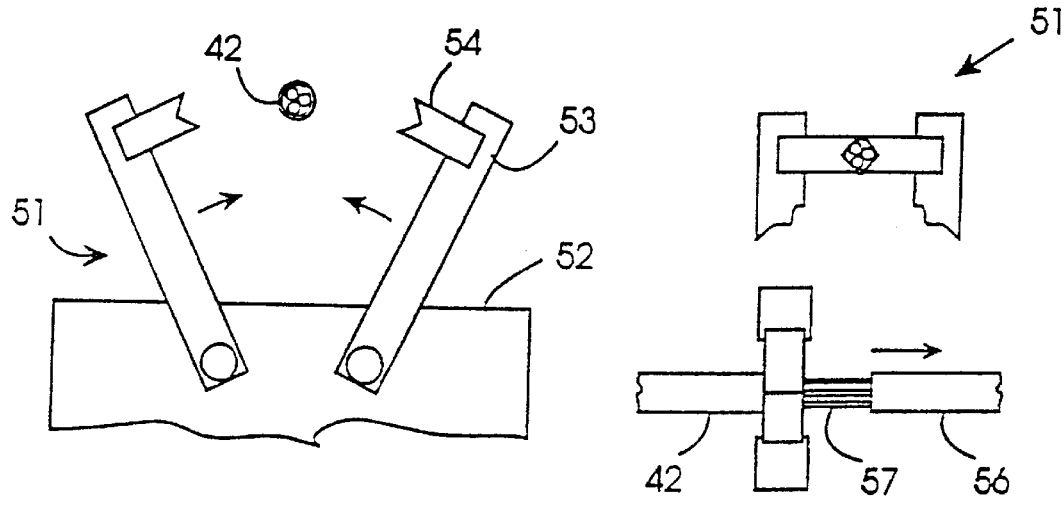

In step 50 illustrated in FIG. 5 a jacket stripping tool 51 is used. The tool 51 comprises a base 52 supporting a pair of pivoted arms 53 which in turn support angled jaws 54. The jaws 54 are configured to cut through the insulating jacket of the cable without damaging the individual cables or wires inside. The jacket is indicated by the numeral 56 and the wires by the numeral 57. It will be appreciated that this is a very simple and effective way of stripping the jacket from cables as the jaws 54 may be easily replaced for cables of different sizes, allowing the tool 51 to be used in a universal manner for a wide variety of different harness products. Alternatively, a number of tools 51 may be provided as they are quite compact. After jackets have been stripped from a batch quality control checks are carried out to ensure that all strip lengths are correct, there is no nicked insulation, jacket foil is not removed from remaining jacket, and wires are not broken or damaged.

Figure 6:
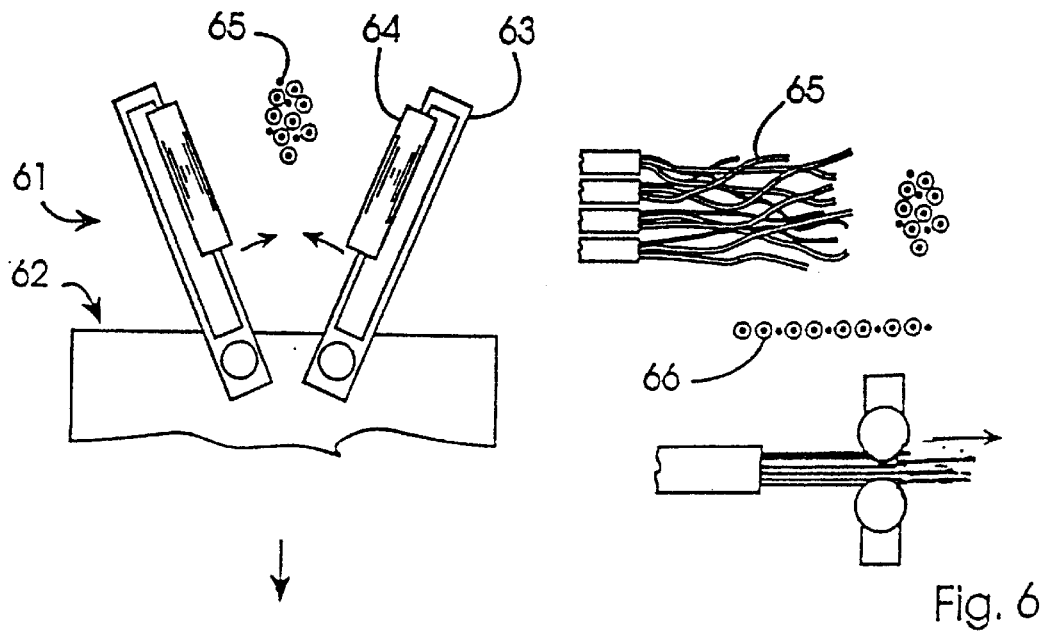

Referring to FIG. 6, a step 60 of unravelling cables is illustrated. This step is important as it aligns the individual cables within the jacket in a single plane so that they can be easily worked upon for subsequent production stages. An unravelling tool 61 is used, which comprises a base 62, a pair of pivoting arms 63, each supporting a cylinder 64. A drive (not shown) is used to pivot the arms to a position spaced-apart by a pre-determined distance. When an operator draws the individual cables or wires 65 between the cylinders 64, they are drawn into alignment. Again, this is a very simple tool to allow unravelling of the wires to simplify downstream processing steps. The tool 61 may be quickly configured for a wide variety of different types of cable with different numbers of individual cables or wires and different thicknesses. After performing the step 60, the operator performs quality control checks to determine if the wires are correctly unravelled and if there has been any damage to insulation.

Figure 7:
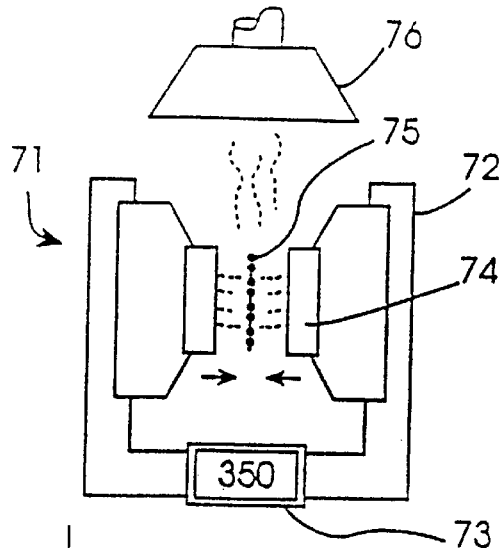
Figure 7:
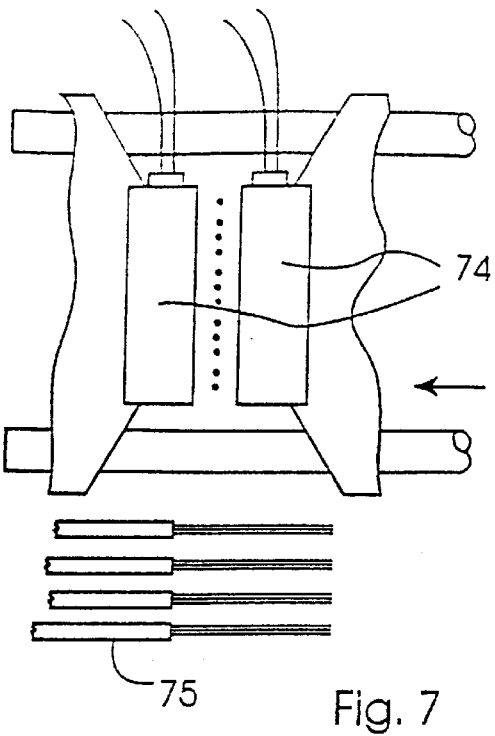

Referring to FIG. 7, a step 70 of stripping insulation from individual cables or wires is illustrated. An apparatus 71 is used which comprises cables 72 interconnecting a controller 73 and heated blades 74. The blades 74 are blunt, being approximately 1 mm wide at the connect side edges. A fume extractor 76 is mounted above the blades 74. As shown in FIG. 7, individual cables 75, which have been previously aligned by the unravelling tool 61 are placed between the blades 74, the blades then being moved inwardly to a position at which they are separated by approximately 0.2 mm greater than the diameter of the wire conductors. This level of heating of the sleeves when the blades are at a temperature of 350° C. allows the sleeves to be easily drawn from the conductors as the set of wires is pulled through the apparatus 71. This is a very simple and effective way of stripping insulating sleeves from a number of cables together. Because a number of cables are stripped simultaneously, the step is very efficient. Also, because heated blades are used, there is a low risk of damage to the conductors. Also, the heating of the insulation allows for very quick sleeve stripping for high efficiency. The quality control checks which are carried out by operators at this stage include checking the stripped length, checking for nicked insulation, and checking for broken or damaged conductors.

Figure 8:
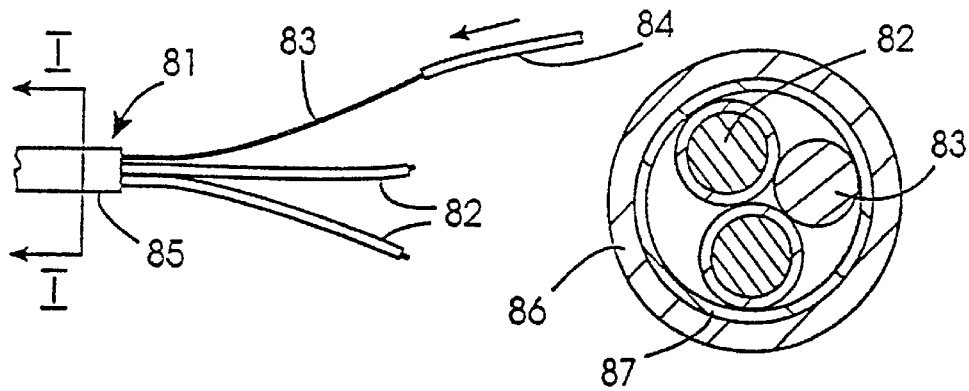
Figure 9:
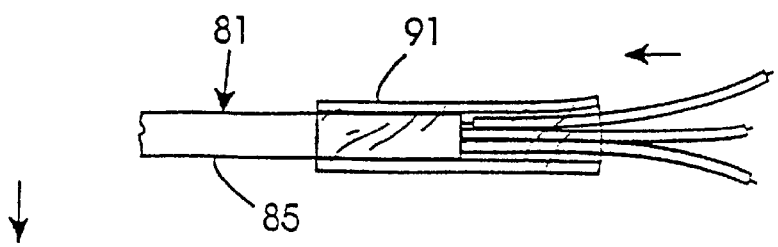

As shown in FIG. 8 a step 80 is then performed with a cable 81 having individual cables or wires 82 including a drain wire 83 which is not insulated. A drain wire sleeve 84 is fitted over the drain wire 83. As shown in the cross-section I—I, the jacket comprises an outer insulating sleeve 86 and an inner foil 87. The foil 87 is in contact with the drain wire 83 to provide an earth leakage path. In step 90 as illustrated in FIG. 9, a protective sleeve 91 is fitted over the cable at the position at which the individual wires extend from the jacket 85. When the operator has performed the steps 80 and 90, he or she performs quality control checks including checking for blisters on the wire insulation, checking that the protective sleeve is not too tight on the jacket, and checking that the protective sleeve is not damaged.

Figure 10:
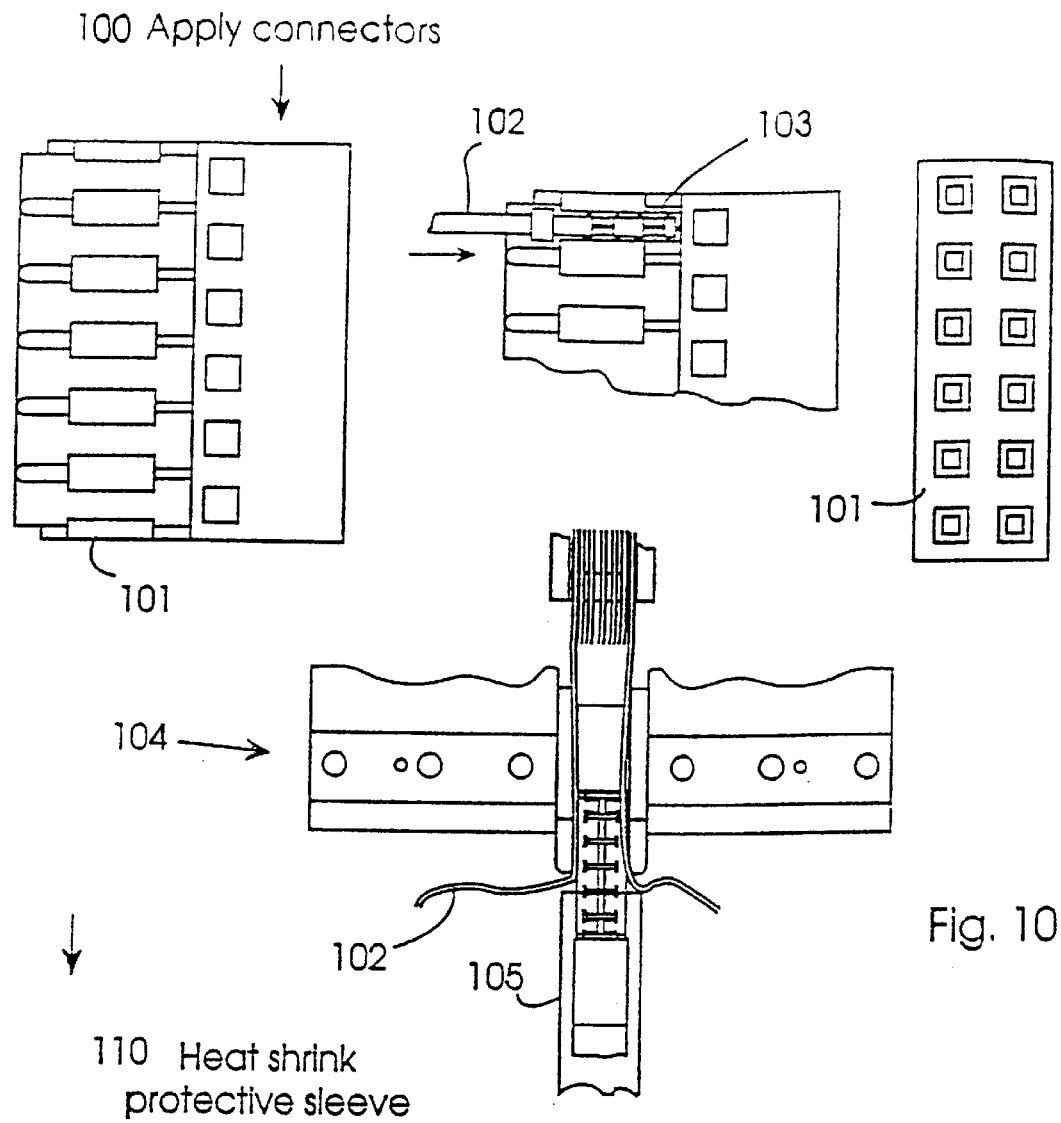

Referring now to FIG. 10, a step 100 of applying connectors to exposed conductors at the end of wires is illustrated. A conductor 101 receives the end of a wire 102 and crimps it using crimping leads 103. This operation is performed using a connectorising machine 104 having a cartridge 105 which moves step-wise inwardly to connect successive pairs of wires 102. After performing this step the operator checks for the following faults:

wrong wire, damaged terminal, short/long wire, reversed wire, damaged wire/insulation, reversed connector, popped contact, incorrect wire depth, damaged/insecure tab, open/damaged strain relief, damaged connector, and sleeve not tied to jacket.

This is a comprehensive set of checks to ensure quality at this production stage.

Figure 11:
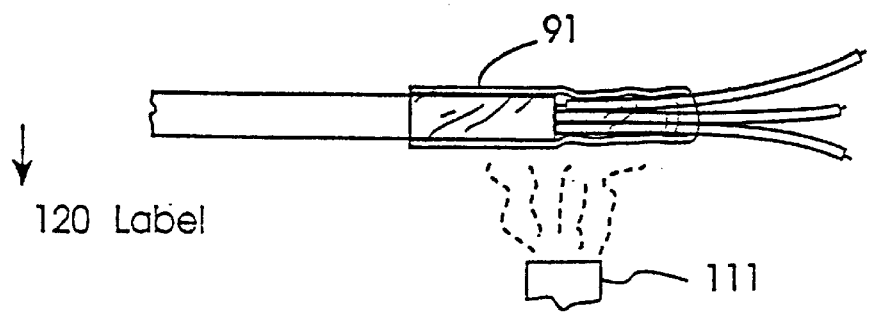
Figure 12:
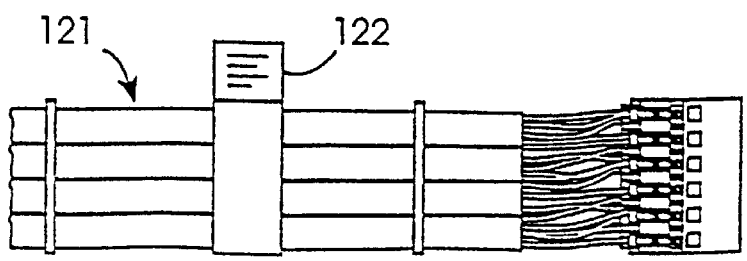
Figure 13:
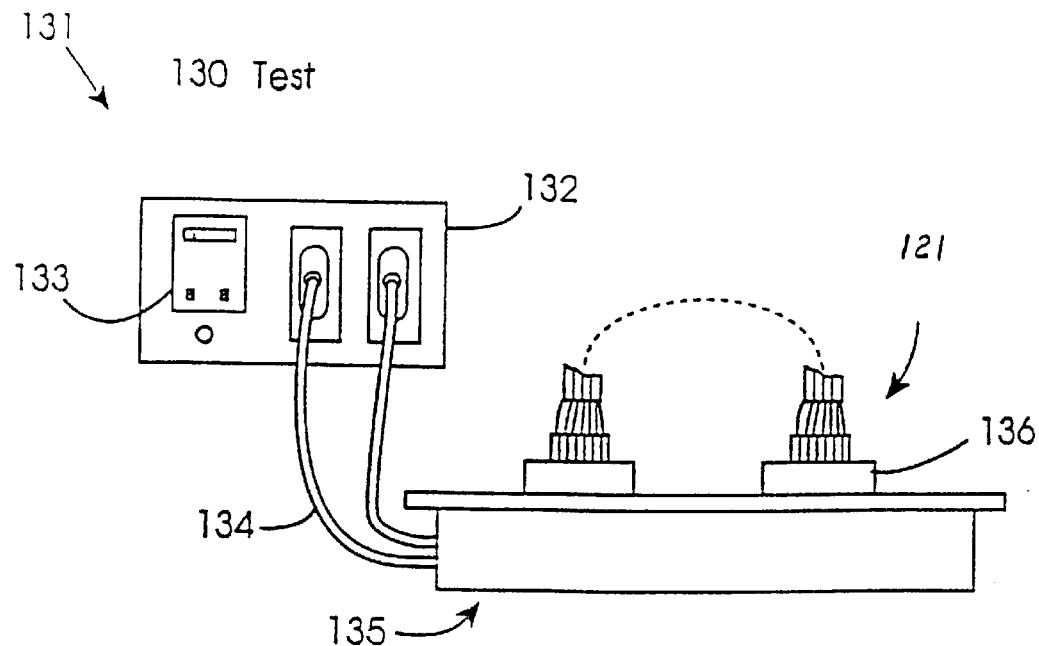

In step 110, the protective sleeve is heat shrinked around the cable as illustrated in FIG. 11. A hot air blower 111 is used. After the protective sleeve has been heat shrunk, the operator performs a quality control check to ensure that the sleeve is in the correct position, that it is fully shrunk around the cable, that the sleeve is not missing, that the sleeve is not split or damaged, and that there is no blister on the cable insulation. In step 12, the harness 121 is labelled with a label 122 secured around it.

Finally, in step 130, the harness 121 is tested using a test apparatus 131. The apparatus 131 comprises a controller 132 having displays 133 and test signal cables 134 connecting it with a test fixture 135. The fixture 135 has sockets 136 to receive the connectors at the ends of the harness 121. The operator inserts the connectors into sockets 136 and then activates the controller 132, which transmits various signals to pins of the sockets 136 to perform continuity and high voltage tests.

Figure 14:
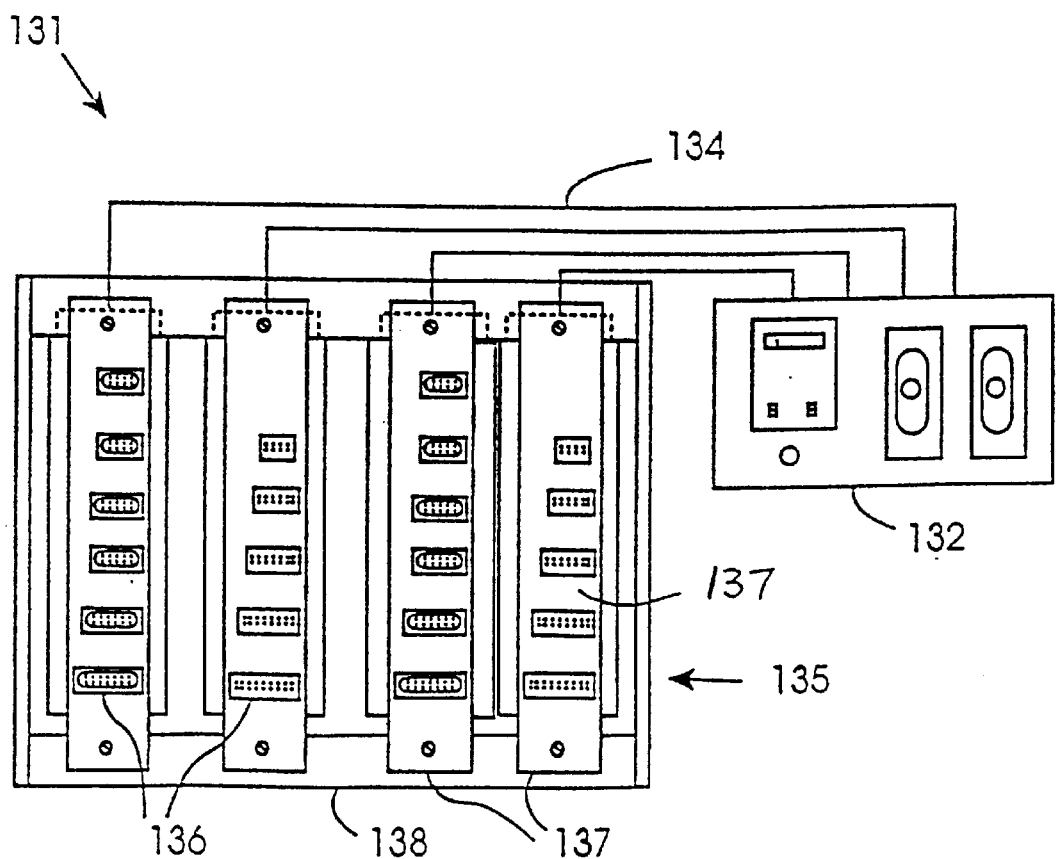
FIG. 14 is a plan view of a test apparatus of the system.
Figure 15:
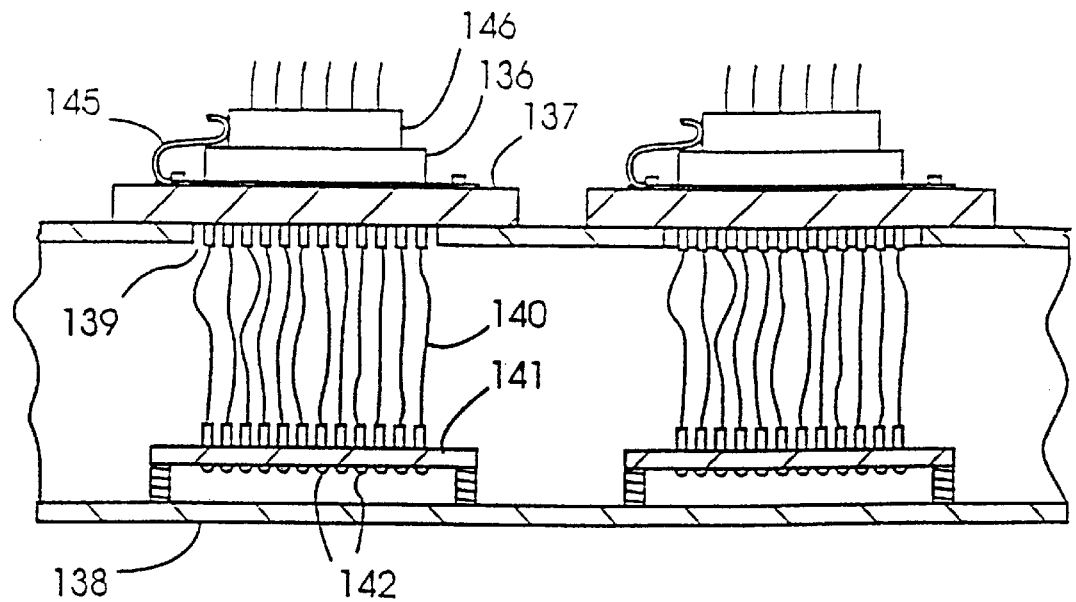
FIG. 15 is a diagrammatic front cross-sectional view of a test fixture of the test apparatus.
Figure 16:
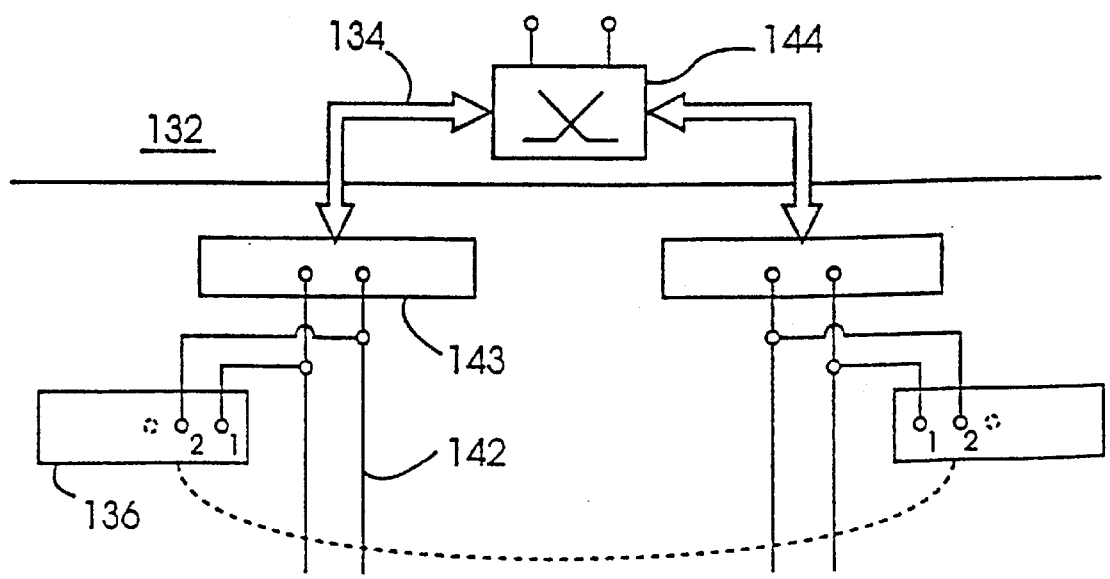
FIG. 16 is an electrical diagram showing connection of harnesses under test in the test apparatus.

Referring in particular to FIGS. 14 to 16, the apparatus 131 comprises four modular socket supports 137 mounted on a box frame 138. Each support 137 supports sockets 136 of a particular type such as the D-type arranged in sequential order according to size.

As shown most clearly in FIG. 15, terminals 139 beneath the sockets 136 are connected to a wiring loom 140 which connect the terminals 139 with terminals on a strip board 141. The strip board comprises a series of parallel bus bars 142 which are on the underneath surface. Referring also to FIG. 16, each bus bar 142 is connected to a particular pin of the series of sockets 136 on each support 137. The bus bars 142 terminate in a terminal block 143 at the back of the fixture 135. The test signal cables 134 interconnect the terminal blocks 143 with a switch 144 in the controller 132.

After an operator inserts opposing connectors of a harness in sockets 136 of two socket supports 137, the switch 144 operates to interconnect each pin with every other pin of the socket in turn to determine continuity. In addition a high voltage test is carried out to determine voltage capability of each individual wire.

Another important aspect of the test apparatus 131 is that a conductive resilient probe 145 is mounted at each socket 136. As illustrated in FIG. 15, the probe 145 contacts the casing of a connector and allows earth leakage tests to be carried out. The probe 145 is not applicable to all types of connector, only those having a conductive housing. This type of test is very important as it detects if the connector halves have nicked wire insulation during assembly, and it also tests integrity of an earth path.

The testing operation can be chanced very quickly for a new type of harness product by simply disconnecting a socket support 137 and reconnecting a different support as required. The strip board 141 can be moved with the socket supports 137 to provide a desired configuration in a short period of time. Further, any faults which arise in the apparatus can be easily detected by the simple bus bar configuration of the strip boards 141.

It will be appreciated that the invention provides a production system which may be used in a very simple and flexible manner for production of a wide range of harness products with a short set-up time and high efficiency.

The invention is not limited to the embodiments described, but may be varied in construction and detail within the scope of the claims.

We claim:

1. A cable harness production system comprising:

a series of movable workstations, each comprising a movable workbench and a movable service rail, wherein each service rail comprises:

an upstanding frame having a pair of uprights and at least one transverse brace, and an electrical power duct extending between the uprights and having an outlet socket and a switch connected to an upwardly-directly service cable;

an overhead electrical power duct grid having sockets connected to the service cables of the workstations;

cable harness production apparatus mounted on the workbenches and receiving power from the service rails; and a test apparatus comprising a controller and a fixture having sockets into which harness connectors are connected, wherein the sockets are mounted on modular socket supports, in turn mounted on a support frame, each socket support having a plurality of sockets of a particular type and being removably mounted on the frame.

2. A system as claimed in claim 1, wherein the sockets of each modular support are connected by an internal loom to a removable strip board beneath the socket support.

3. A system as claimed in claim 1, wherein sockets of each modular support are connected by an internal loom to a removable strip board beneath the socket support, and the strip board comprises a plurality of parallel bus bars, each bus bar being connected to a particular terminal of all sockets on the socket support.

4. A system as claimed in claim 3, wherein the controller comprises means for interconnecting combinations of bus bars to perform continuity and high voltage tests.

5. A system as claimed in claim 1, wherein each service rail further comprises a pneumatic supply extending between the uprights, the supply having connectors along its length.

6. A system as claimed in claim 1, wherein the production apparatus includes an unravelling tool comprising a pair of cylinders mounted on supports which are movable between an open position and a closed position at which the cylinders are spaced-apart by a pre-determined distance for unravelling of twisted cables drawn between the cylinders.

7. A system as claimed in claim 1, wherein the production apparatus includes a sleeve stripping tool comprising a pair of heated blades mounted on supports movable between open and closed positions, the blades being spaced-apart in the closed position by a distance slightly greater than the conductor diameter whereby the blades heat insulation and allow the insulation to be drawn off the conductors as the cables are pulled through the tool.

8. A system as claimed in claim 7, wherein the blades are heated to a temperature of approximately 350° C.

9. A system as claimed in claim 7, wherein the stripping tool further comprises a fume extractor mounted above the blades.

* * * * *